(12) United States Patent
Inao et al.

(10) Patent No.: US 9,744,924 B2
(45) Date of Patent: Aug. 29, 2017

(54) WIRE HARNESS

(71) Applicant: Yazaki Corporation, Minato-ku, Tokyo (JP)

(72) Inventors: Shinichi Inao, Makinohara (JP); Hideomi Adachi, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/904,349

(22) PCT Filed: Jul. 9, 2014

(86) PCT No.: PCT/JP2014/068363
§ 371 (c)(1),
(2) Date: Jan. 11, 2016

(87) PCT Pub. No.: WO2015/005402
PCT Pub. Date: Jan. 15, 2015

(65) Prior Publication Data
US 2016/0152196 A1    Jun. 2, 2016

(30) Foreign Application Priority Data

Jul. 12, 2013  (JP) .................................. 2013-146313

(51) Int. Cl.
*H02G 3/04* (2006.01)
*B60R 16/02* (2006.01)
(Continued)

(52) U.S. Cl.
CPC ............ *B60R 16/0207* (2013.01); *B60K 1/04* (2013.01); *B60K 6/28* (2013.01); *B60K 6/40* (2013.01);
(Continued)

(58) Field of Classification Search
CPC ............ B60R 16/0207; B60R 16/0215; H02G 3/0487; H02G 3/04; H01B 7/0045
(Continued)

(56) References Cited

U.S. PATENT DOCUMENTS 3,639,672 A * 2/1972 Kafka ..................... H01B 12/16
174/125.1
2011/0067920 A1* 3/2011 Toyama .............. B60R 16/0207
174/72 A
(Continued)

FOREIGN PATENT DOCUMENTS

JP          2000-188021 A      7/2000
JP        2000188021 A  *      7/2000
(Continued)

OTHER PUBLICATIONS

Oct. 14, 2014—International Search Report—Intl Application No. PCT/2014/068363.
(Continued)

*Primary Examiner* — Sherman Ng
(74) *Attorney, Agent, or Firm* — Banner & Witcoff, Ltd.

(57) ABSTRACT

A wire harness includes a high voltage electrically conductive path which is an electrically conductive path, and a sheath member which is formed with a tubular member of a rectangular configuration and accommodates the high voltage electrically conductive path therein. In the sheath member, thick parts whose thicknesses are increasing toward inside at positions according to angular parts of an outer peripheral surface are set.

5 Claims, 5 Drawing Sheets

(51) Int. Cl.
*B60K 1/04* (2006.01)
*B60K 6/28* (2007.10)
*B60K 6/40* (2007.10)
*H01B 7/00* (2006.01)

(52) U.S. Cl.
CPC ....... *B60R 16/0215* (2013.01); *H01B 7/0045* (2013.01); *H02G 3/04* (2013.01); *H02G 3/0487* (2013.01)

(58) Field of Classification Search
USPC ...................................... 174/72 A
See application file for complete search history.

(56) References Cited

U.S. PATENT DOCUMENTS

| | | | |
|---|---|---|---|
| 2011/0094796 A1* | 4/2011 | Toyama | B60R 16/0207 174/72 A |
| 2011/0132638 A1 | 6/2011 | Oga et al. | |
| 2011/0133548 A1* | 6/2011 | Toyama | B60R 16/0215 307/9.1 |
| 2012/0305308 A1* | 12/2012 | Toyama | B60R 16/0207 174/70 R |

FOREIGN PATENT DOCUMENTS

| | | |
|---|---|---|
| JP | 2007-252060 A | 9/2007 |
| JP | 2010-051042 A | 3/2010 |
| JP | 2012-210101 A | 10/2012 |

OTHER PUBLICATIONS

Oct. 14, 2014—(WO) Written Opinion of the ISA—Intl Application No. PCT/2014/068363, Eng Tran.
Apr. 4, 2017—(JP) Notification of Reasons for Refusal—App 2013-146313, Eng Tran.

* cited by examiner

WIRE HARNESS

TECHNICAL FIELD

The present invention relates to a wire harness.

BACKGROUND ART

Usually, a wire harness is known which electrically connects together high voltage devices mounted on a hybrid motor vehicle or an electric vehicle. The wire harness is formed with an electrically conductive path and a sheath member which accommodates the electrically conductive path therein as main members. The sheath member is formed with a hollow tubular member, which is desired to be hardly bent even when a bending stress is applied thereto by considering a protection of the electrically conductive path, a regulation of the path and a working property when the sheath member is attached to the vehicle.

On the other hand, a structure is known in which a part having flexibility is selectively set in a sheath member in order to ensure a degree of freedom for bending which meets an arrangement or wiring path or to make easy a treatment during a packing or transportation.

Patent literature 1 discloses a wire harness including a plurality of groups of electric wires corresponding to the electrically conductive path and a harness protecting member corresponding to the sheath member. Here, the harness protecting member includes harness protecting pipes and bellows shaped harness protecting pipes which are alternately connected. The harness protecting pipes are arranged in a straight line part of an arrangement or wiring path of the wire harness. On the other hand, the bellows shaped harness protecting pipes are bent and arranged in accordance with a curvature of a curve part of the arrangement or wiring path of the wire harness. Thus, the wire harness can be properly attached and protected in accordance with a configuration of the arrangement or wiring path of the wire harness.

PATENT LITERATURE

[Patent Literature 1]: JP-A-2012-210101

SUMMARY OF INVENTION

Technical Problem

In such a wire harness, since the sheath member needs to regulate the path of the electrically conductive path or ensure the working property during an arrangement and wiring operation in the vehicle, the sheath member is requested to have a prescribed rigidity.

The present invention is devised by considering the above-described problem and it is an object of the present invention to provide a wire harness having a sheath member excellent in its rigidity.

Means for Solving the Problem

In order to solve the above-described problem, the present invention includes an electrically conductive path and a tubular sheath member which accommodates the electrically conductive path in an inner part. The sheath member is configured in a polygonal form including a plurality of angular parts in an outer periphery and has thick parts formed in which a thickness is increasing toward the inner part at positions according to the angular parts.

Here, in the present invention, the thick parts are preferably formed as contact parts which come into contact with the electrically conductive path.

Further, in the present invention, the contact parts of the thick parts are preferably set to configurations corresponding to an outline of the electrically conductive path.

Advantageous Effects of Invention

According to the present invention, in the sheath member, since a rigidity of the tubular member is ensured by the angular parts of the sheath member and the thick parts are set at the positions corresponding to the angular parts, the rigidity of the sheath member can be more improved. Thus, the wire harness including the sheath member excellent in its rigidity can be provided.

DESCRIPTION OF EMBODIMENTS

Figure 1:
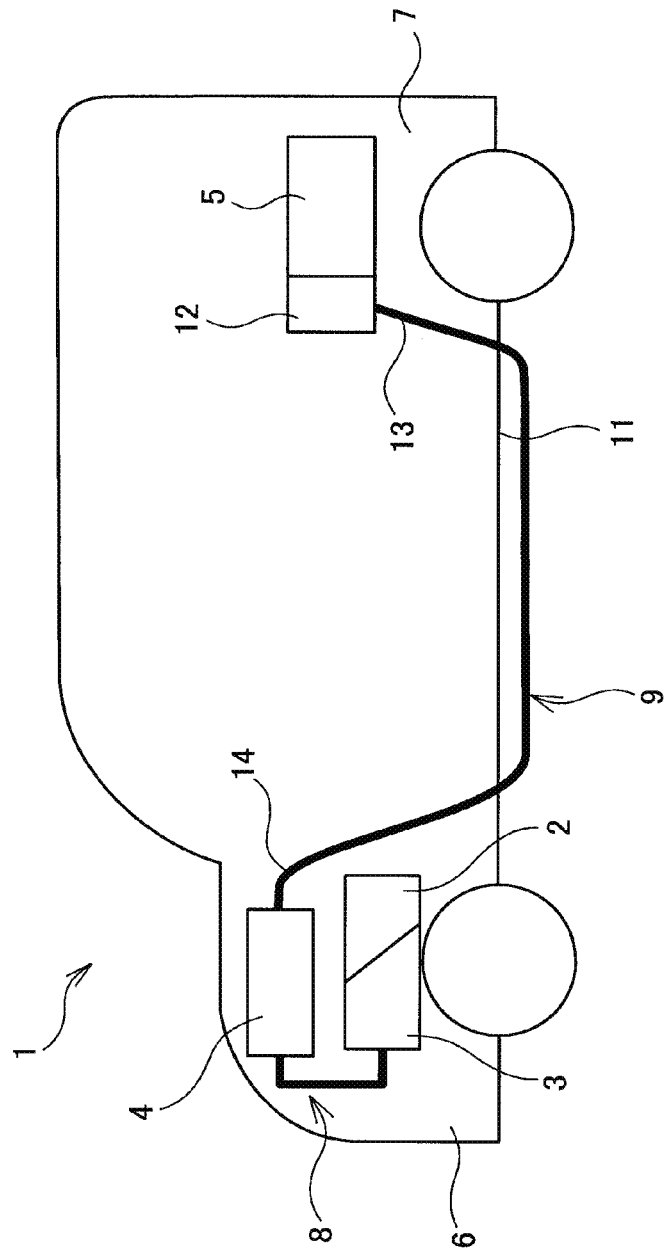
FIG. 1 is a schematic view showing an arranged state of a wire harness according to the present embodiment.

FIG. 1 is a schematic view showing an arranged state of a wire harness 9 according to the present embodiment. The wire harness 9 according to the present embodiment is used for a hybrid motor vehicle 1 and arranged in a prescribed position of the hybrid motor vehicle 1.

The hybrid motor vehicle 1 is a vehicle which is driven by combining together two powers of an engine 2 and a motor unit 3. To the motor unit 3, an electric power from a battery 5 (a battery pack) is supplied through an inverter unit 4. The engine 2, the motor unit 3 and the inverter unit 4 are mounted on an engine room 6 in the vicinity of front wheels. Further, the battery 5 is mounted on a rear part 7 of the motor vehicle in the vicinity of rear wheels, however, the battery may be mounted in an interior of the motor vehicle located in a rear part of the engine room 6.

The motor unit 3 and the inverter unit 4 are connected together by a wire harness 8 for a high voltage. Further, the battery 5 and the inverter unit 4 are also connected together by the wire harness 9. The wire harness 9 is arranged in an under-floor 11 of the motor vehicle by considering a suppression of radiation noise and laid substantially in parallel with and along the under-floor 11 the motor vehicle. The under-floor 11 of the motor vehicle is a well-known body, what is called a panel member and has through holes formed at prescribed positions. The wire harness 9 is water-tightly inserted into the thorough holes and end parts of the wire harness 9 are respectively introduced to the engine room 6 and the rear part 7 of the motor vehicle.

The wire harness 9 and the battery 5 are connected to each other through a junction block 12. To the junction block 12, a rear end 13 of the wire harness 9 is electrically connected. Further, a front end 14 of the wire harness 9 is electrically connected to the inverter unit 4.

The motor unit 3 functions as a motor and a generator and is formed as a motor assembly including a shield case.

Further, the inverter unit 4 includes an inverter and a converter in its structure and is formed as an inverter assembly including a shield case. The battery 5 is an Ni—NH type or an Li-ion type and formed as a module. As the battery 5, a storage battery device such as a capacitor may be used.

Figure 2:
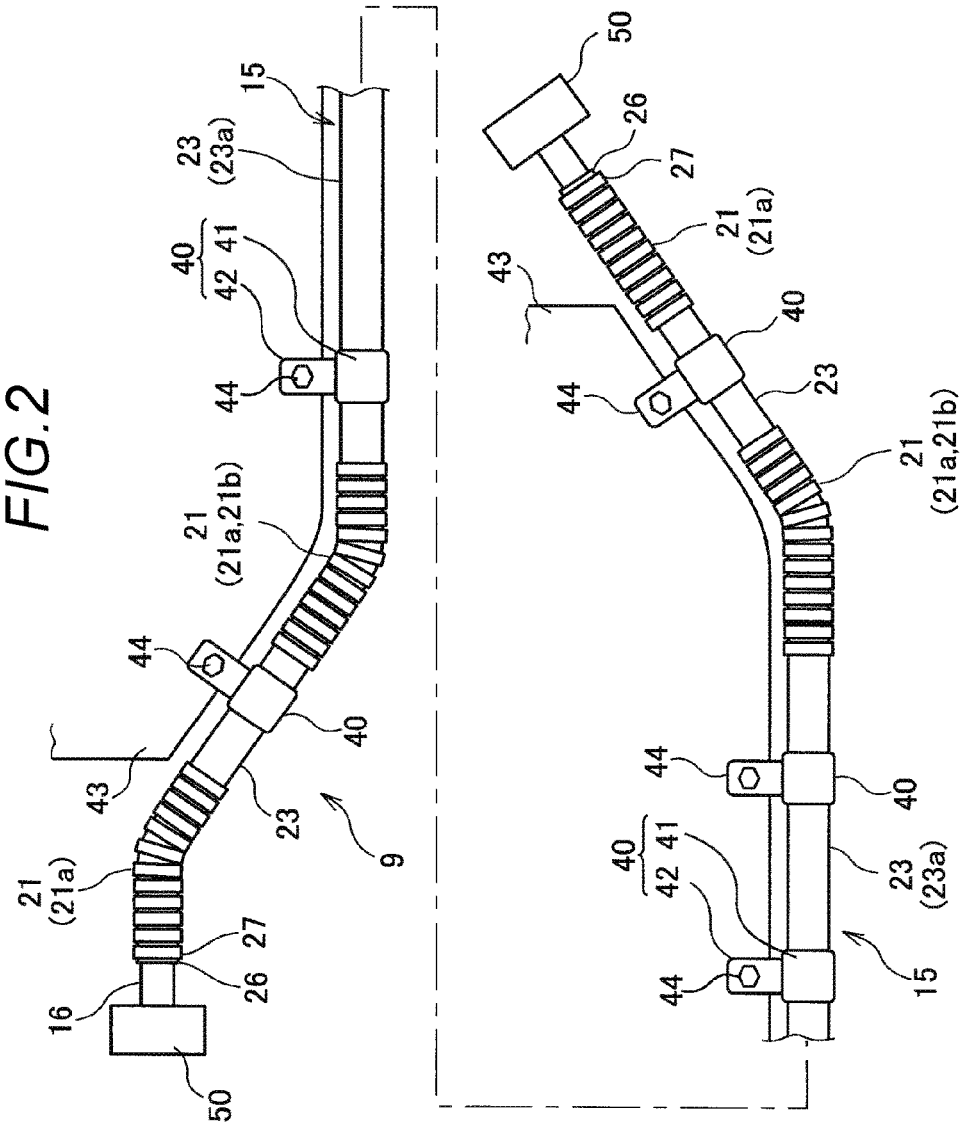
FIG. 2 is a side view which schematically shows the wire harness when a path is arranged.
Figure 3:
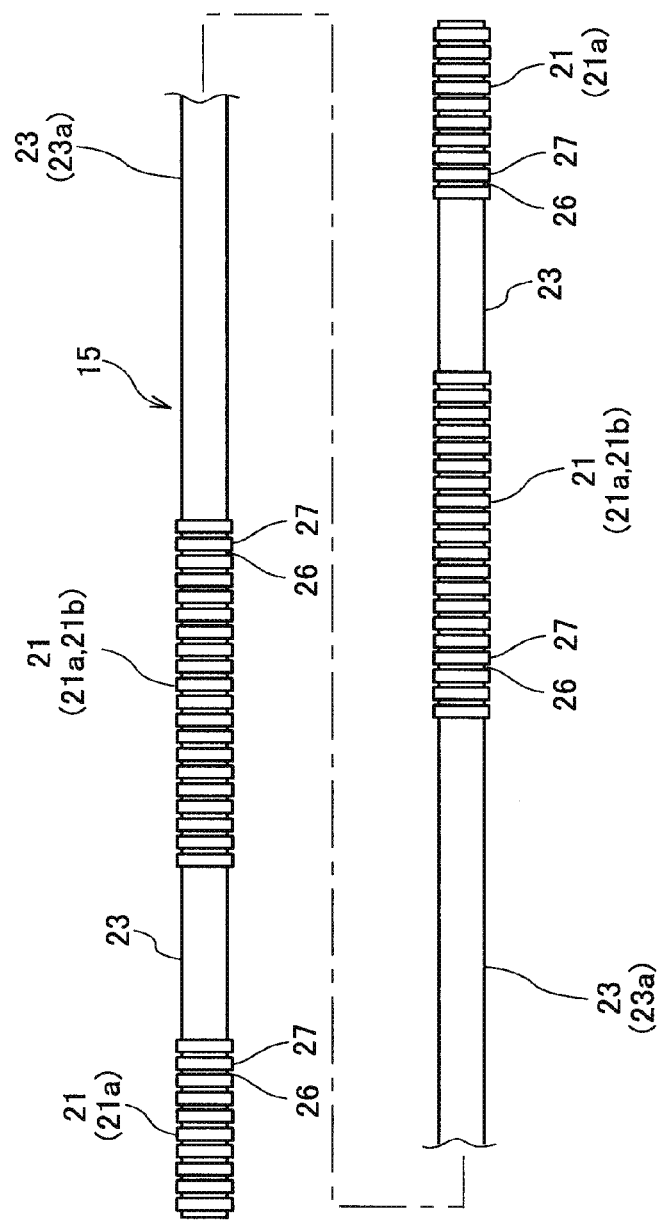
FIG. 3 is a side view schematically showing a sheath member.
Figure 4:
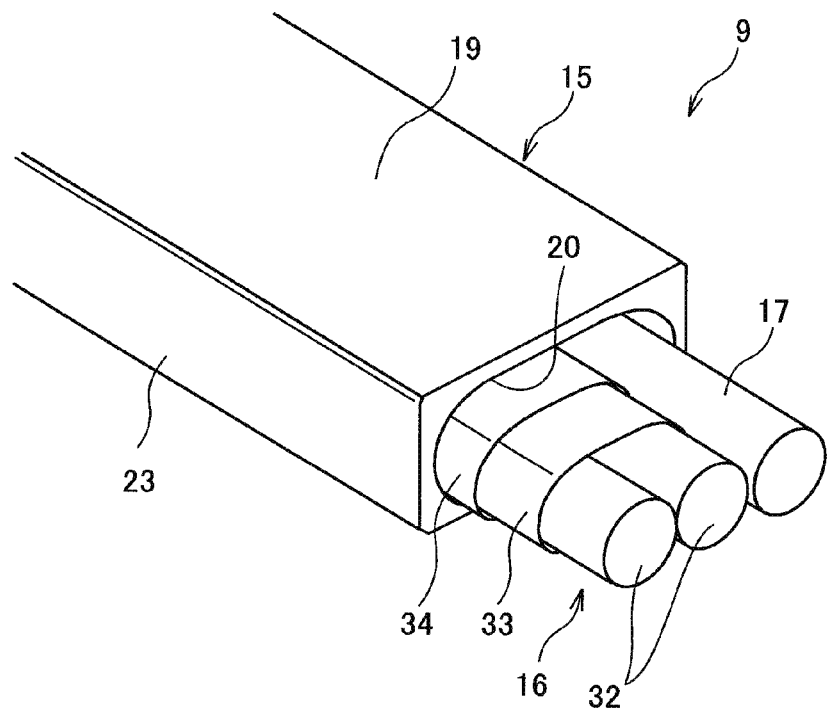
FIG. 4 is a perspective view schematically showing the wire harness and a high voltage electrically conductive path.
Figure 5:
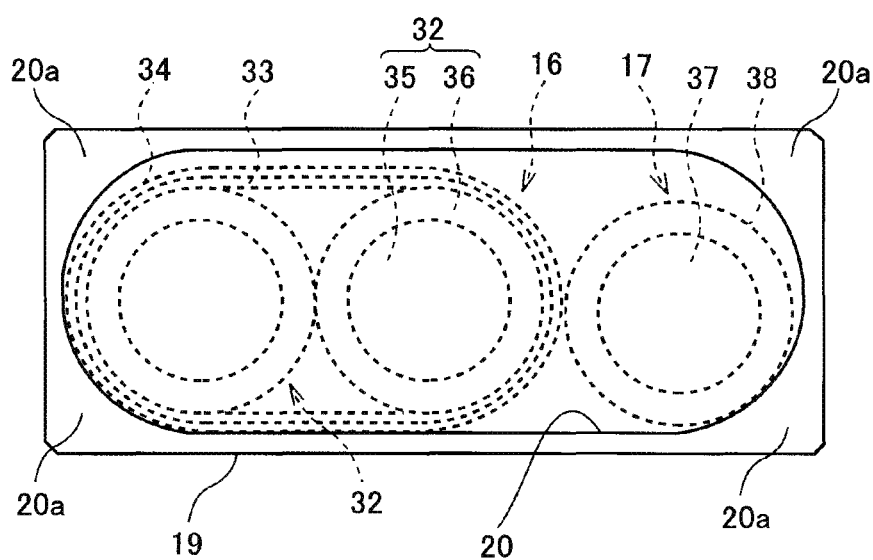
FIG. 5 is a sectional view schematically showing the sheath member.

FIG. 2 is a side view which schematically shows the wire harness 9 when a path is arranged. FIG. 3 is a side view schematically showing a sheath member 15. FIG. 4 is a perspective view schematically showing the wire harness 9 and a high voltage electrically conductive path 16. FIG. 5 is a sectional view schematically showing the sheath member 15. The wire harness 9 includes the sheath member 15 and the high voltage electrically conductive path 16 (an electrically conductive path) which is accommodated and protected in the sheath member 15 as main members.

The sheath member 15 is a member which accommodates the high voltage electrically conductive path 16 therein and protects the high voltage electrically conductive path 16. The sheath member 15 is formed with a tubular member including a rectangular configuration in section and has a long tubular form. The sheath member 15 is formed by a resin molding and set so as to have a length necessary to insert and accommodate the high voltage electrically conductive path 16 and a thickness necessary to protect the high voltage electrically conductive path 16. In the present embodiment, the sheath member 15 accommodates a low voltage electrically conductive path 17 (an electrically conductive path) together with the high voltage electrically conductive path 16.

The sheath member 15 is set to a configuration including no joint, nor slit which leads to an inner peripheral surface 20 from an outer peripheral surface 19 of the sheath member 15.

The sheath member 15 includes one or more corrugated parts 21 and one or more straight parts 23 and is integrally formed under a state that the corrugated parts 21 and the straight parts 23 are connected together in series. The sheath member 15 is configured in such a way that an entire part has a linear form under a state that the corrugated parts 21 are not bent. The corrugated parts 21 and the straight parts 23 are set in arbitrary positions and with ranges (lengths) in an axial direction of a tube of the sheath member 15.

The corrugated parts 21 are parts which have a prescribed flexibility in the sheath member 15. The sheath member 15 can be bent at a necessary angle by using the flexibility provided in the corrugated parts 21.

The corrugated parts 21 include first corrugated parts 21a which are bent during an arrangement of the wire harness 9 to form a bent configuration along an arrangement or wiring path and second corrugated parts 21b which are bent in a packed state of the wire harness 9 and during its transportation to form a bent configuration along a packing and transporting form.

The first corrugated parts 21a are arranged in positions necessary to fit the wire harness 9 to a vehicle attached configuration, namely, a configuration to which the wire harness 9 is attached or arranged and formed with such lengths as to be adapted to the configuration to which the wire harness 9 is attached or arranged. Thus, the first corrugated parts 21a can bend the sheath member 15 with the lengths and at angles necessary for the vehicle attached configuration.

The second corrugated parts 21b are arranged at positions necessary to fit the wire harness 9 to the bent configuration during the packing and transportation and formed with such lengths as to be adapted to the bent configuration. Thus, the second corrugated parts 21b can bend the sheath member 15 respectively at desired angles in the packed state of the wire harness 9 or during its transportation.

The first corrugated parts 21a may have functions as the second corrugated parts 21b at the same time. Conversely, the second corrugated parts 21b may have functions as the first corrugated parts 21a at the same time.

The corrugated parts 21 include rectangular configurations in section intersecting at right angles to the axial direction of the tube and bellows shaped configurations which repeat protruding parts and recessed parts in the axial direction of the tube. Specifically, the corrugated parts 21 are formed in such a way that the recessed parts 26 and the protruding parts 27 respectively formed in a circumferential direction are alternately arranged and formed along the axial direction of the tube. The corrugated parts may have configurations other than the bellows shaped configurations. When the corrugated parts 21 have a flexibility, configurations thereof are not especially limited.

The straight parts 23 are parts which have the flexibility lower than those of the corrugated parts 21 in the sheath member 15, and preferably hold their attitudes to a bending stress, namely, the parts including strength for resisting against a bending. The sheath member 15 can ensure its rigidity in an entire part due to the existence of the straight parts 23. Further, the straight parts 23 also function as parts to which below-described clamps 40 are attached.

The straight parts 23 include straight parts 23a for an under-floor arranged in the under-floor 11 of the motor vehicle. Since the straight parts 23a for the under-floor are arranged in the under-floor 11 of the motor vehicle (arranged so as to be arranged and extended along, for instance, a lean hose), the straight parts 23a for the under-floor are formed to be long 5. Since the straight parts 23a for the under-floor are long, when a difficulty arises during the transportation of the wire harness, the second corrugated parts 21b may be provided in intermediate parts of the straight parts 23a for the under-floor.

The straight parts 23 have rectangular configurations in section intersecting at right angles to the axial direction of the tube, for instance, linear configurations extending straight in the axial direction of the tube.

As one of features of the present embodiment, thick parts 20a are set in the straight parts 23. The thick parts 20a are set at positions corresponding to angular parts of the outer peripheral surface 19. In the present embodiment, four thick parts 20a are set correspondingly to four angular parts of the straight parts 23.

The thick parts 20a are formed in such a way that the thickness of the straight parts 23 is increasing toward inside, namely, increasing toward an inner part of the sheath member 15. Due to the existence of the thick parts 20a, the thickness of the angular parts and in the vicinities thereof in the straight parts 23 is larger than the thickness of parts located between the angular parts and angular parts to provide a configuration whose thickness is partly increasing.

Further, since the thick parts 20a are made to protrude inside, the thick parts 20a serve as contact parts which come into contact with a part of the high voltage electrically conductive path 16. In this case, when surface configurations of the thick parts 20a (namely, configurations which form the inner peripheral surfaces 20 of the straight parts 23) are set to circular arc forms corresponding to an outline of the high voltage electrically conductive path 16 accommodated in the sheath member 15, the contact parts can be ensured so as to have wide areas.

Since the thick parts 20a serve to improve the rigidity in the straight parts 23 as one of objects, the thick parts 20a are continuously formed in the axial direction of the tube.

The clamps 40 include tube body attaching parts 41 formed so as to meet outer configurations of the straight parts 23 and cantilever fixing parts 42 continuous to the tube body attaching parts 41. In the fixing parts 12, bolt insert holes (not shown in the drawing) are formed to pass through. The wire harness 9 is attached and fixed to an object 43 to be fixed such as the under-floor 11 of the motor vehicle through bolts 44 inserted into the bolt insert holes. When the wire harness 9 is attached and fixed to the object 43 to be fixed, an arrangement of a path is completed.

As post-attaching members other than the clamps 40, clips, grommets, protectors or the like are supposed to be exemplified. The clamps 40 are also vehicle fixing parts and such parts functioning as the vehicle fixing parts may be molded with resin together with the straight parts 23.

In both terminal parts of the wire harness 9, shield connectors 50 are respectively provided. One shield connector 50 is a shield connector of the inverter side. The other shield connector 50 is a shield connector of the battery side. The shield connectors 50 are connected and fixed to the high voltage electrically conductive path 16 pulled out from the corrugated parts 21.

The high voltage electrically conductive path 16 has two high voltage circuits 32. Since the wire harness 9 electrically connects the inverter unit 4 to the battery 5 the junction block 12), the high voltage circuits 32 are formed to be long.

The high voltage circuit 32 is formed with a conductor 35 and an insulator 36 with which the conductor 35 is coated.

The conductor 35 is manufactured by copper, copper alloy, or aluminum or aluminum alloy. The conductor 35 may have either a conductor structure that element wires are twisted or stranded or a round rod shaped conductor structure (for instance, a conductor structure with a flat type single core or a round single core, and in this case, an electric wire itself is also rod shaped). In such a conductor 35, the insulator 36 made of an insulating resin material is extrusion molded on an outer surface of the conductor 35.

As the high voltage circuit 32, a structure of a well-known high voltage electric wire is used in the present embodiment. However, the high voltage circuit is not limited thereto. Namely, a high voltage circuit which is formed by providing an insulator in a known bus bar may be used.

Further, in the two high voltage circuits, are provided a shield member 33 which covers the two high voltage circuits 32 and a sheath 34 provided outside the shield member 33.

The shield member 33 is an electromagnetically shielding member (a shield member for a countermeasure to an electromagnetic wave) which covers the two high voltage circuits 32 together, and a stranded member is adopted which is formed by stranding many element wires in a tubular form. The shield member 33 is formed to have a substantially same length as an entire length of the two high voltage circuits 32. In the shield member 33, an end part thereof is connected to a shield case (an illustration is omitted) of the inverter unit 4 (see FIG. 1) through the shield connector 50.

For the shield member 33, when the countermeasure to the electromagnetic wave can be made, a metallic foil having electric conductivity or a member including the metallic foil may be used.

The sheath 34 is formed by extrusion molding an insulating resin material outside the shield member 33 so as to have a prescribed thickness and arranged in a position as an outermost layer of the high voltage electrically conductive path 16. A terminal part of the sheath 34 is worked so as to expose a prescribed, length of the shield member 33 in manufacturing the wire harness 9. As a state after the terminal part is worked, the sheath 34 is slightly longer than, for instance, the sheath member 15. Further, in the high voltage electrically conductive path 16, the sheath 34 may not be provided.

The low voltage electrically conductive path 17 is formed with, for in stance, one low voltage circuit. The low voltage circuit includes a conductor 37 and an insulator 38 which covers the conductor 37. The low voltage electrically conductive path 17 is formed so as to have a length necessary for an electric connection.

Now, a manufacture, transportation and a path arrangement of the wire harness 9 will be described below.

The high voltage electrically conductive path 16 and the low voltage electrically conductive path 17 are inserted into the sheath member 15. Then, the shield connectors 50 are provided in both the terminal parts of the high voltage electrically conductive path 16, so that the wire harness 9 is manufactured.

After the wire harness 9 is manufactured, the wire harness is bent so as to be folded in sections of the second corrugated parts 21b, so that an entire length of the wire harness 9 is shortened, and the wire harness 9 is packed in the smallest width. Namely, an entire part of the wire harness 9 is packed in a compact state. Then, the wire harness is 9 is transported under the compact state.

The transported wire harness 9 is supplied to an attaching process to the hybrid motor vehicle 1. Then, as shown in FIG. 2, when the first corrugated parts 21a are bent at necessary angles along the arrangement or wiring path of the under-floor 11 of the hybrid motor vehicle 1 to attach and fix the wire harness 9 to the object 43 to be fixed through the clamps 40, the arrangement, of the path is completed.

As described above, the wire harness 9 according to the present embodiment includes the high voltage electrically conductive path 16 as one of the electrically conductive paths and the sheath member 15 which is formed with the tubular member of the rectangular configuration and accommodates the electrically conductive paths (as examples of the high voltage electrically conductive path 16 and the low voltage conductive path 17) therein. The sheath member 15 has the thick parts 20a whose thicknesses increase inside, namely, toward the inner part of the sheath member 15 provided at the positions corresponding to the angular parts of the outer peripheral surface 19.

In the present embodiment, the straight parts 23 forming the sheath member 15 include the tubular configurations with the rectangular forms in four side surfaces which are connected together through the angular parts and are designed to improve the rigidity due to the existence of the angular parts. Further, owing to the existence of the thick parts 20a located at the angular parts of the outer peripheral surface 19, the rigidity of the straight parts 23 can be improved. Thus, the wire harness 9 including the sheath member 15 excellent in its rigidity can be realized. As a result, even when the bending stress is applied to the wire harness 9, the wire harness is hardly bent and can properly ensure a desired rigidity to regulate the path of the electrically conductive path or rigidity necessary for an arranging or attaching operation of the wire harness to the vehicle.

When the thick parts 20a are not provided, not only a higher rigidity cannot be obtained, but also a large clearance is generated between the inner surface 20 and the electrically conductive paths at the positions corresponding to the angular parts of the outer peripheral surface 19, and the clearance forms a dead space. Since the dead space becomes a heat insulating layer, a heat radiation efficiency of the electrically conductive paths is supposed to be lowered.

However, according to the present embodiment, since the thick parts 20a are present at the positions corresponding to the angular parts of the outer peripheral surface 19, the clearance generated between the inner peripheral surface of the sheath member 15 and the electrically conductive paths accommodated therein is suppressed, so that the dead space can be eliminated. Thus, since a distance between the electrically conductive paths and the sheath member 15 decreases, the heat radiation efficiency can be restrained from being deteriorated.

Further, in the present embodiment, the thick parts 20a serve as the contact parts which come into contact with the electrically conductive path.

According to the above-described structure, a heat transfer path which is caused by the thick parts 20a is newly formed between the inner peripheral surface 20 of the straight part 23 and the electrically conductive path. Thus, since a heat can be urged to move from the electrically conductive path to the straight part 23, a heat radiation performance of the electrically conductive path can be improved. In the present embodiment, the four thick parts 20a are formed, however, all of them do not need to come into contact with the electrically conductive paths. It is satisfactory to have a relation that at least one thick part 20a comes into contact with the electrically conductive path.

Further, in the present embodiment, the contact parts of the thick parts 20a are set to the configurations which meet the outline of the electrically conductive path.

According to such a structure, since the configurations of the thick parts 20a are fitted to those of the electrically conductive paths, the contact parts are increasing. Thus, since the heat transfer can be urged between the electrically conductive path and the straight parts 23, the heat radiation performance of the electrically conductive path can be improved.

The thick parts 20a most preferably include the configurations corresponding to those of electrically conductive wires, however, at least one parts of the thick parts 20a may become the contact parts. The thick parts 20a may have any configuration. For instance, the thick parts 20a may be set to linear configurations or configurations which protrude toward the electrically conductive path side (inside).

The wire harness according to the present embodiment is described above, however, the present invention is not limited to the embodiment and may be variously changed within a range of the present invention. For instance, in the present embodiment, the sheath member includes the corrugated parts and the straight parts respectively, however, the sheath member may include only straight parts. Further, the wire harness is applied not only to the hybrid motor vehicle, but also to an electric vehicle or an ordinary motor vehicle. Further, the electrically conductive path may be not only formed with a plurality of electric wires, but also merely provided with a single electric wire. Further, the straight parts as the tubular members may have the tubular configurations that a plurality of side surface parts is connected together through the angular parts. The straight parts may be satisfied when their sectional configurations are recognized as polygonal configurations. In this case, it is to be understood that the individual side surfaces forming the polygonal configurations may have linear configurations as shown in FIG. 5, or round configurations which expand inside or outside.

Here, features of the above-described embodiment of the wire harness according to the present invention will be respectively briefly summarized as described below in [1] to [3].

[1] A wire harness (9) provided with:
an electrically conductive path (a high voltage electrically conductive path 16), and
a tubular sheath member (15) which accommodates the electrically conductive path (the high voltage electrically conductive path 16) in an inner part,
wherein the sheath member (15) is formed in a polygonal configuration including a plurality of angular parts in an outer periphery and the sheath member (15) includes thick parts (20a) whose thicknesses are increasing toward the inner part at positions corresponding to the angular parts.

[2] A wire harness (9) according to the above-described [1], wherein the thick parts (20a) include contact parts which are in contact with the electrically conductive path (the high voltage conductive path 16).

[3] A wire harness (9) according to the above-described [1] wherein the contact parts of the thick parts (20a) are set to configurations according to an outline of the electrically conductive path (the high voltage electrically conductive path 16).

The present invention is described in detail by referring to the specific embodiment. It is to be understood to a person with ordinary skill in the art that various changes or modifications can be made without departing from the spirit and scope of the present invention.

This application is based on Japanese Patent Application (JPA No. 2013-146313) filed on Jul. 12, 2013 and its contents are incorporated herein as a reference.

INDUSTRIAL APPLICABILITY

According to the present invention, in the sheath member, since the rigidity for the tubular member is ensured by the angular part of the sheath member and the thick parts are set at the positions corresponding to the angular parts, the rigidity of the sheath member can be effectively more improved.

The present invention having the above-described effect is available to the wire harness including the sheath member excellent in its rigidity.

REFERENCE SIGNS LIST

1 . . . hybrid motor vehicle
2 . . . engine
3 . . . motor unit
4 . . . inverter unit
5 . . . battery
9 . . . wire harness
11 . . . under-floor of vehicle
15 . . . sheath member
16 . . . high voltage electrically conductive path
17 . . . low voltage electrically conductive path
21 . . . corrugated part
23 . . . straight part
26 . . . recessed part
27 . . . protruding part
40 . . . clamp
43 . . . object to be fixed
44 . . . bolt
50 . . . shield connector

What is claimed is:

1. A wire harness comprising:
   an electrically conductive path including a high voltage electrically conductive path and a low voltage electrically conductive path; and
   a tubular sheath member which accommodates the electrically conductive path in an inner part,
   wherein the tubular sheath member is formed in a polygonal configuration including a plurality of angular parts in an outer periphery and the tubular sheath member includes four thick parts whose thicknesses are approximately the same and increasing toward the inner part at positions corresponding to the angular parts.

2. The wire harness according to claim 1, wherein the thick parts include contact parts which are in contact with the electrically conductive path.

3. The wire harness according to claim 2, wherein the contact parts of the thick parts are set to configurations according to an outline of the electrically conductive path.

4. The wire harness according to claim 1, wherein the high voltage electrically conductive path is provided with a shield member covering the high voltage electrically conductive path and a sheath covering the shield member.

5. The wire harness according to claim 3, wherein the contact parts of the thick parts include parts of an elliptical shape.

* * * * *